United States Patent Office 2,734,808
Patented Feb. 14, 1956

2,734,808 p-PHENYLENEDIAMINE GASOLINE STABILIZERS AND COMPOSITIONS CONTAINING THE SAME

Charles B. Biswell, Woodstown, N. J., assignor to E. I. du Pont de Nemours and Company, Wilmington, Del., a corporation of Delaware No Drawing. Application January 6, 1951,
Serial No. 204,830

10 Claims. (Cl. 44—74)

This invention relates to new chemical compounds which are useful for inhibiting gum formation in motor fuels, and to stabilized gasoline compositions containing such compounds.

It is well known that hydrocarbon motor fuels, particularly those manufactured by catalytic processes such as cracking and polymerization, tend to form during storage insoluble gummy decomposition products. This gum forms resin-like deposits in the carburetor and intake manifold and on the valve stems of internal combustion engines in which the gasoline is used. As the gum forms, the gasoline also tends to deteriorate in color and in antiknock value.

The cause of the gum formation in such cracked gasolines is not entirely known. However, it is believed to be caused by the auto-oxidation, polymerization and condensation of highly reactive constituents such as unsaturated hydrocarbons present in the gasoline mixture. As these unsaturated compounds are destroyed, the antiknock rating of the gasoline decreases. Straight-run gasolines do not ordinarily have the same undesirable tendency to deteriorate as do cracked gasolines, although blended stocks containing a mixture of cracked gasoline and straight-run gasoline usually are subject to this tendency.

The constituents which cause gum formation may be removed by severe treatment of the gasoline with chemicals such as sulfuric acid. Such treatment results in the loss of valuable antiknock constituents of the gasoline and is generally avoided as much as possible.

When saturated gasoline is treated with lead compounds as is common in the preparation of aviation fuels, the composition frequently deposits an insoluble residue on storage. This residue is known to be due primarily to the decomposition of tetraalkyl lead compound. This decomposition is very undesirable since the octane number of the fuel is reduced thereby, and the insoluble material fouls the fuel intake system of the engine.

It is known that the deterioration of hydrocarbon motor fuels can be retarded to a higher or lesser degree by the incorporation in a fuel of certain organic phenolic and amino compounds. Compounds which presently enjoy wide commercial use in this application are 2,4,6-trialkylphenols, N-alkyl-p-aminophenols and N-N'-di(sec-alkyl)-p-phenylenediamines. The trialkylphenols are relatively poor gum inhibitors but are generally effective stabilizers for tetraethyl lead in aviation fuels. The N-alkyl-p-aminophenols, such as N-(n-butyl)-p-aminophenol and N-isobutyl-p-aminophenol, are effective both for inhibiting gum formation and also for stabilizing lead in gasoline. These aminophenols cannot be used in aviation fuels because of their tendency to accumulate in the fuel intake system.

Of the p-phenylenediamine derivatives, N-N'-di(sec-butyl)-p-phenylenediamine is used extensively as a gum inhibitor in cracked hydrocarbons and as a lead stabilizer in aviation fuels. Although this compound is a highly useful inhibitor, it is subject to the disadvantage that it develops decomposition products having a red color and high tinctorial properties. This characteristic is objectionable when the material is used in aviation fuels which are colored with soluble dyes to designate the grade or octane range of the fuel. Oxidation of this inhibitor in samples of blue gasoline has been known to produce a purple colored gasoline with subsequent misidentification of the fuel. Furthermore, when automotive motor fuel inhibited with N-N'-di(sec-butyl)-p-phenylenediamine is spilled on a light-colored automobile finish, an undesirable discoloration results.

N,N'-diaryl-p-phenylenediamines, particularly N-N'-diphenyl-p-phenylenediamine, have been disclosed in U. S. Patent 1,940,815 to be desirable antioxidants for use in rubber. U. S. Patent 2,163,640 teaches, however, that these diaryl compounds are less effective as gum inhibitors in gasoline than are the corresponding di(secondary alkyl) compounds.

It is an object of this invention to provide a new class of organic compounds which are highly effective in gasoline compositions, both for inhibiting the formation of gum in cracked or polymerized gasoline and for retarding the deterioration of tetraalkyl lead in leaded gasolines and particularly in aviation fuels. A further object is to provide compounds which display this stabilizing effect and which do not decompose to give compounds imparting an undesired color to the gasoline composition. A still further object is to provide useful stabilized gasoline compositions and particularly compositions of this sort which contain tetraethyl lead.

It has now been found that excellent stabilizing properties are possessed by N-(sec-alkyl)-N'-phenyl-p-phenylenediamines in which the secondary alkyl group contains from 3 to 11 carbon atoms. Members of this class of compounds in which the secondary alkyl group contains up to and including 7 carbon atoms are particularly effective. The formula of these compounds may be represented by

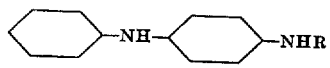

in which R stands for the secondary alkyl groups. By "secondary alkyl" is meant a monovalent radical derived from a saturated aliphatic hydrocarbon by the removal of a hydrogen atom from a carbon atom which is directly attached to two other carbon atoms. A preferred member of this class of compounds is N-(sec-butyl)-N'-phenyl-p-phenylenediamine. Other representative members of the class which are useful stabilizing agents for gasoline are N-isopropyl-N'-phenyl-p-phenylenediamine, N - (1,3 - dimethylbutyl) - N' - phenyl - p - phenylenediamine, N - (1 - methylhexyl) - N' - phenyl - p - phenylenediamine, N - (1 - isobutylisoamyl) - N' - phenyl - p - phenylenediamine and N - (1 - methyldecyl) - N' - phenyl - p - phenylenediamine. Compounds of this type in which the secondary alkyl group contains more than 11 carbon atoms possess some stabilizing properties, but are less useful practically, because of their greater weight and lower volatility.

The compounds herein disclosed are almost colorless liquids with freezing points close to room temperature. They are readily soluble in petroleum hydrocarbons but insoluble in water and in aqueous alkalies. Upon oxidation they do not develop objectionable red decomposition products of high tinctorial strength as does N,N'-di(sec-butyl)-p-phenylenediamine, but instead develop products having a brown color of low tinctorial power.

These compounds may be prepared by the reductive alkylation of p-amino, p-nitroso- or p-nitrodiphenylamine with an aliphatic ketone and hydrogen in the presence of a suitable hydrogenation catalyst such as nickel, copper chromite or platinum. They may also be prepared by heating aniline with the corresponding N-(sec-alkyl)-p-aminophenol, or by condensing a secondary alkyl primary amine with p-hydroxydiphenylamine.

The stabilizers of this invention are effective in retarding the formation of gum in gasolines containing unsaturated hydrocarbons, such as are produced by cracking or by the polymerization of olefines. They are also useful in retarding the deterioration of leaded gasolines, even in the case of those compositions which contain little or no unsaturates. A further usefulness of these compounds is in connection with the stabilizing of leaded gasolines which have been prepared from aged tetraethyl lead solutions. It is common practice to prepare what is sometimes known as "aviation mixes," which are concentrated solutions of tetraethyl lead in gasoline, and to add portions of these solutions to gasoline base stock in order to produce the final leaded gasoline. When aged aviation mixes are used, the resulting gasolines are particularly insensitive to the ordinary stabilizers. The new compounds of the present invention however are effective in producing satisfactory stabilization of leaded gasolines prepared from aged aviation mixes.

The amount of the stabilizers to be added to the gasoline is dependent on the particular hydrocarbon fuel used, the amount of pro-oxidant metal present and the stability requirements of the treated composition. Usually only small amounts are necessary to effect the desired degree of stabilization. The amount of stabilizer will generally vary from 0.0001 percent to about 0.05 percent by weight, while a preferred range is from 0.001 to 0.005 percent by weight. The most advantageous concentration of inhibitor for a particular gasoline composition is readily determined by the ordinary tests and observations ordinarily employed in the art. Other materials such as dyes, antiknock agents, metal deactivators and the like may be employed in conjunction with the stabilizers.

The following examples illustrate the manner in which the compounds of this invention may be prepared:

*Example 1*

98 grams of p-nitrosodiphenylamine, 600 grams of methylethyl ketone, 25 cc. of distilled water, 0.2 cc. of 85 percent phosphoric acid and 10 grams of platinum black catalyst, consisting of 1 percent platinum on a carbon support, are mixed in a suitable autoclave and subjected to hydrogenation under a hydrogen pressure of 200 to 500 p. s. i. at about 150° C. After the absorption of hydrogen has ceased the reaction mixture is cooled, removed from the autoclave and filtered. The filtrate is evaporated under a vacuum of about 30 mm. at 150° C. to remove any excess methylethyl ketone. The residue of crude N-(sec-butyl)-N'-phenyl-p-phenylenediamine is then vacuum distilled. The practically water-white liquid product which distills at 156–157° C. at 1 mm. absolute pressure weighs 113 grams. This represents 95.1 percent of the theoretical yield of N-(sec-butyl)-N'-phenyl-p-phenylendiamine based on the p-nitrosodiphenylamine.

*Example 2*

A hydrogenation autoclave is charged with 92 grams of of p-aminodiphenylamine, 242 grams of diisobutyl ketone, 900 grams of isopropyl alcohol and 10 grams of platinum black catalyst consisting of 1 percent platinum on a carbon support. The charge is hydrogenated at 50–150° C. and 500 p. s. i. pressure. After the absorption of hydrogen has ceased, the reaction mixture is cooled and filtered to remove the catlyst. The filtrate is concentrated by distilling to a temperature of 150° C. at 30 mm. pressure. On vacuum distillation of the residue, there are obtained 106 grams of N-(1-isobutylisoamyl)-N'-phenyl-p-phenylene-diamine which distills at 200–205° C. at 1 mm. pressure.

In the same manner as described in these examples, p-nitroso-, p-amino- or p-nitrodiphenylamine may be alkylated under reducing conditions with dimethyl ketone to give N-isopropyl-N'-phenyl-p-phenylenediamine boiling at 148–152° C. at 2 mm. pressure, with methylisobutyl ketone to give N-(1,3-dimethylbutyl)-N'-phenyl-p-phenylenediamine boiling at 163–165° C. at 1 mm. pressure, with methylamyl ketone to give N-(1-methylhexyl)-N'-phenyl-p-phenylenediamine boiling at 168–172° C. at 1 mm. pressure, with methylnonyl ketone to give N-(1-methyldecyl) - N' - phenyl - p - phenylenediamine boiling above 210° C. at 5 mm. pressure, and with other ketones having up to 11 carbon atoms. When the higher members of the series are being prepared, it is often more convenient to purify the product by recrystallization instead of by vacuum distillation as in the examples. In this case, the crude reaction product, after removal of water and extra ketone by distillation, is recrystallized from a solvent such as benzene or a mixture of benzene and petroleum ether.

The superior stabilizing properties of these new compounds are shown by the following tests.

*Example 3*

Individual portions of complete refined thermally cracked naphthas containing no chemical agents such as dyes, antioxidants and antiknocks are treated with 0.003 percent by weight of the stabilizing compounds shown in the table below. The inhibited samples of motor fuels are tested in accordance with A. S. T. M. method D 522–46 for the gum stability of gasoline. The results of this test are expressed in terms of the "induction period," which is the amount of time required for oxygen absorption to begin. In these tests the antioxidant characteristics are compared with those of N,N'-di(sec-butyl)-p-phenylenediamine, which is a well established commercial gasoline antioxidant, and with N,N'-diphenyl-p-phenylenediamine. The addition of 0.003 percent by weight of N-N'-di(sec-butyl)-p-phenylenediamine, increased the induction period to 300 minutes as compared with 164 minutes for the unstabilized gasoline. This 136 minute increase in the induction period is taken as the standard and is assigned the value of 100. The effectiveness of the other stabilizers, i. e., the increase which they produce in the induction period, is shown in relation to this value.

| Antioxidant | Efficiency | |
|---|---|---|
| | Weight Basis | Molar Basis |
| N,N'-di(sec-butyl)-p-phenylenediamine | 100 | 100 |
| N,N'-diphenyl-p-phenylenediamine | 80 | 95 |
| N-isopropyl-N'-phenyl-p-phenylenediamine | 108 | 111 |
| N-(sec-butyl)-N'-phenyl-p-phenylenediamine | 119 | 130 |
| N-(1,3-dimethylbutyl)-N'-phenyl-p-phenylenediamine | 110 | 139 |
| N-(1-methylhexyl)-N'-phenyl-p-phenylenediamine | 110 | 141 |
| N-(1-isobutylisoamyl)-N'-phenyl-p-phenylenediamine | 90 | 123 |
| N-(1-methyldecyl)-N'-phenyl-p-phenylenediamine | 79 | 123 |

It will be observed that the compounds of this invention are effective gasoline antioxidants and that the efficiencies of the compounds having up to 7 carbon atoms in the secondary alkyl group are greater on either a weight or a molar basis than those of N,N'-di-(sec-butyl)-p-phenylenediamine or of N,N'-diphenyl-p-phenylenediamine. The higher members of the series are similarly more efficient on a molar basis than the compounds of reference.

*Example 4*

A sample of untreated commercial thermally cracked gasoline is treated with 0.001 percent by weight of a commercial metal deactivator, di(2-hydroxybenzal)-1,2-diaminopropane, and portions of this fuel are then inhibited with various amounts of N-(sec-butyl)-N'-phenyl-p-phenylenediamine. The induction period of each sample is determined by the method described in Example 3.

The effect of varying the amount of the inhibitor in this fuel is shown in the following table.

| Weight Percent Metal Deactivator | Weight Percent Inhibitor | Induction Period (Minutes) |
|---|---|---|
| None | None | 33 |
| 0.001 | None | 57 |
| 0.001 | 0.0001 | 74 |
| 0.001 | 0.0005 | 158 |
| 0.001 | 0.005 | 441 |
| 0.001 | 0.05 | 2,382 |

It is seen from these data that the inhibitors of this invention are effective over a wide range of concentration.

*Example 5*

A saturated aviation gasoline base stock adapted to give 100 octane fuel when mixed with the proper amount of tetraethyl lead solution is tested for stability by oxidizing a sample in an A. S. T. M. bomb at 100° C. and 100 p. s. i. initial oxygen pressure. The induction period of the unleaded gasoline stock is greater than 77 hours.

This same gasoline base stock is mixed with enough freshly prepared "aviation mix," i. e., concentrated tetraethyl lead solution, to give 4.6 ml. tetraethyl lead and 2.49 ml. of ethylenedibromide per gallon of fuel and is stabilized by the addition of 0.001 percent by weight of N,N'-di(sec-butyl)-p-phenylenediamine. The induction period of the mixture is 1837 minutes.

When the same gasoline stock is mixed with the same amount of aviation mix which has been exposed to air and stored for five days, the induction period of the unstabilized lead gasoline is 144 minutes. Addition of 0.001 percent by weight of N,N'-di(sec-butyl)-p-phenylenediamine to this mixture increases the induction period to only 949 minutes. A fuel prepared in the same way from aged aviation mix but stabilized with 0.001 percent by weight of N-(sec-butyl)-N'-phenyl-p-phenylenediamine has an induction period of 2023 minutes.

It will thus be observed that the N-(sec-butyl)-N'-phenyl-p-phenylenediamine is a particularly effective stabilizer in relation to N,N'-di(sec-butyl)-p-phenylenediamine, when employed with leaded gasolines prepared from aged tetraethyl lead solutions.

I claim:

1. N-(sec-alkyl)-N'-phenyl - p - phenylenediamine in which the secondary alkyl group contains from 3 to 11 carbon atoms.

2. N-(sec-butyl)-N'-phenyl-p-phenylenediamine.

3. N-isopropyl-N'-phenyl-p-phenylenediamine.

4. Gasoline containing, as a stabilizer against rapid deterioration upon aging, a stabilizing amount of N-(sec-alkyl)-N'-phenyl-p-phenylenediamine in which the secondary alkyl group contains from 3 to 11 carbon atoms.

5. Gasoline containing, as a stabilizer against rapid deterioration upon aging, from 0.0001 to 0.05 percent by weight of N-(sec-alkyl)-N'-phenyl-p-phenylenediamine in which the secondary alkyl group contains from 3 to 11 carbon atoms.

6. Gasoline containing, as a stabilizer against rapid deterioration upon aging, from 0.0001 to 0.05 percent by weight of N-(sec-butyl)-N'-phenyl-p-phenylenediamine.

7. Gasoline containing, as a stabilizer against rapid deterioration upon aging, from 0.0001 to 0.05 percent by weight of N-isopropyl-N'-phenyl-p-phenylenediamine.

8. Leaded gasoline containing, as a stabilizer against rapid deterioration upon aging, a stabilizing amount of N-(sec-alkyl)-N'-phenyl-p-phenylenediamine in which the secondary alkyl group contains from 3 to 11 carbon atoms.

9. Leaded gasoline containing, as a stabilizer against rapid deterioration upon aging, from 0.0001 to 0.05 percent by weight of N-(sec-alkyl)-N'-phenyl-p-phenylenediamine in which the secondary alkyl group contains from 3 to 11 carbon atoms.

10. Leaded gasoline containing, as a stabilizer against rapid deterioration upon aging, from 0.0001 to 0.05 percent by weight of N-(sec-butyl)-N'-phenyl-p-phenylenediamine.

References Cited in the file of this patent

UNITED STATES PATENTS

| 2,067,686 | Semon | Jan. 12, 1937 |
| 2,163,640 | Von Bramer et al. | June 27, 1939 |
| 2,256,189 | Bogemann et al. | Sept. 16, 1941 |
| 2,395,382 | Walters | Feb. 19, 1946 |
| 2,436,838 | Von Bramer et al. | Mar. 2, 1948 |
| 2,494,059 | Ruggles | Jan. 10, 1950 |
| 2,496,930 | Brimer | Feb. 2, 1950 |
| 2,498,630 | Thompson | Feb. 28, 1950 |
| 2,635,042 | Hill | Apr. 14, 1953 |

FOREIGN PATENTS

| 23,533 | Australia | July 17, 1935 |

OTHER REFERENCES

Wieland et al.: "Chemical Abstracts" (1921), volume 15, pages 70 to 71. (Available in Scientific Library, U. S. Patent Office, Washington 25, D. C.)

Disclaimer 2,734,808.—*Charles B. Biswell*, Woodstown, N.J. p-Phenylenediamine Gasoline Stabilizers and Compositions Containing the Same. Patent dated Feb. 14, 1956. Disclaimer filed July 22, 1959, by the assignee, *E. I. du Pont de Nemours and Company*.

Hereby enters this disclaimer to claims 1 and 3 of said patent.

[*Official Gazette September 1, 1959.*]